(12) United States Patent
Richardson

(10) Patent No.: US 12,473,187 B2
(45) Date of Patent: Nov. 18, 2025

(54) METHODS AND SYSTEMS FOR AUTOMATIC DISPENSING OF BEVERAGE

(71) Applicant: LaRoy K Richardson, Clinton, MD (US)

(72) Inventor: LaRoy K Richardson, Clinton, MD (US)

( * ) Notice: Subject to any disclaimer, the term of this patent is extended or adjusted under 35 U.S.C. 154(b) by 0 days.

(21) Appl. No.: 17/831,722

(22) Filed: Jun. 3, 2022

(65) Prior Publication Data

US 2022/0289547 A1 Sep. 15, 2022

Related U.S. Application Data

(60) Provisional application No. 63/227,367, filed on Jul. 30, 2021.

(51) Int. Cl.
| | |
|---|---|
| B67D 1/08 | (2006.01) |
| B65G 1/06 | (2006.01) |
| B67D 1/00 | (2006.01) |
| G07F 13/10 | (2006.01) |

(52) U.S. Cl.
CPC ............ B67D 1/0041 (2013.01); B65G 1/06 (2013.01); B67D 1/0888 (2013.01); B67D 1/0894 (2013.01); G07F 13/10 (2013.01); B67D 2001/0095 (2013.01)

(58) Field of Classification Search
CPC .......... B67D 2001/0095; B67D 1/0888; B67D 1/0041; G07F 13/10
See application file for complete search history.

(56) References Cited

U.S. PATENT DOCUMENTS

| | | | | |
|---|---|---|---|---|
| 2,925,196 | A * | 2/1960 | Stoner | B65G 59/102 221/245 |
| 6,550,638 | B1 * | 4/2003 | Mochida | A47F 1/106 221/124 |
| 2005/0038559 | A1 * | 2/2005 | Ghidotti | G07F 11/72 221/96 |
| 2007/0106422 | A1 * | 5/2007 | Jennings | B25J 9/0084 222/129.1 |
| 2022/0172549 | A1 * | 6/2022 | Chung | G06Q 20/4014 |
| 2022/0267135 | A1 * | 8/2022 | Degnan | B67B 5/034 |

\* cited by examiner

*Primary Examiner* — Jason K Niesz
(74) *Attorney, Agent, or Firm* — Pasadena Legal Group; Norman R. Van Treeck

(57) ABSTRACT

The embodiments herein disclose methods and systems for automatic dispensing of liquid, and more particularly to dispensing a liquid shots and pre-filled liquid beverages based on user requirement. Embodiment herein disclose methods and systems for automatic dispensing of liquid shots of pre-defined cup size. Embodiments herein disclose methods and systems for avoiding the wastage of beverages based on user requirements.

12 Claims, 11 Drawing Sheets

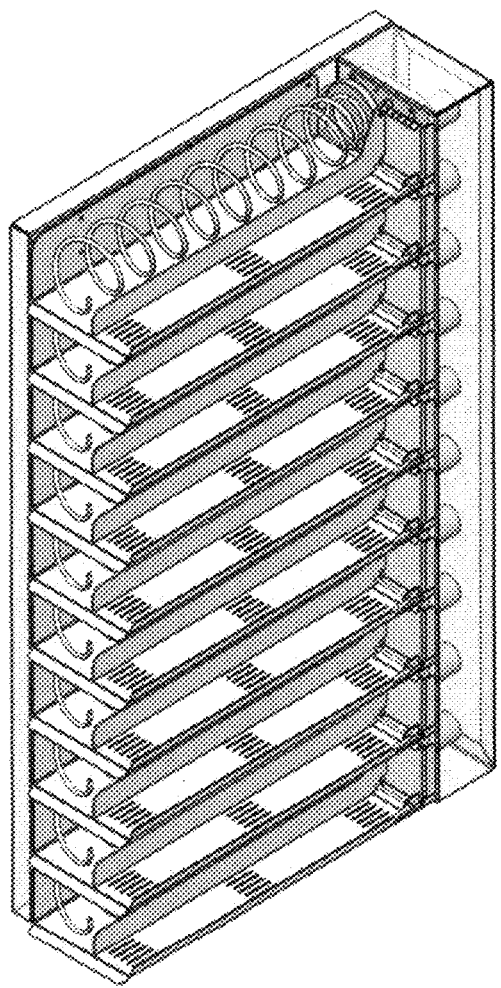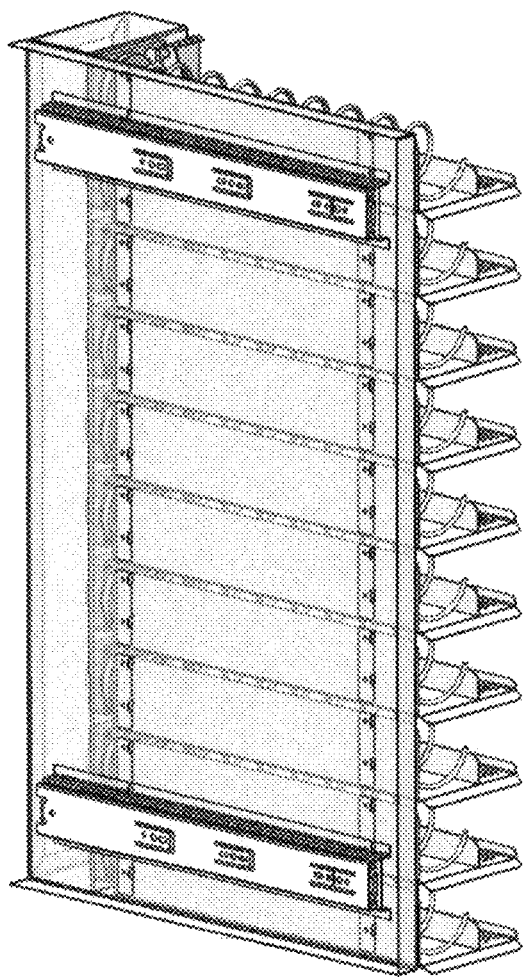
FIG. 3a
[PRIOR ART]
FIG. 3b
[PRIOR ART]

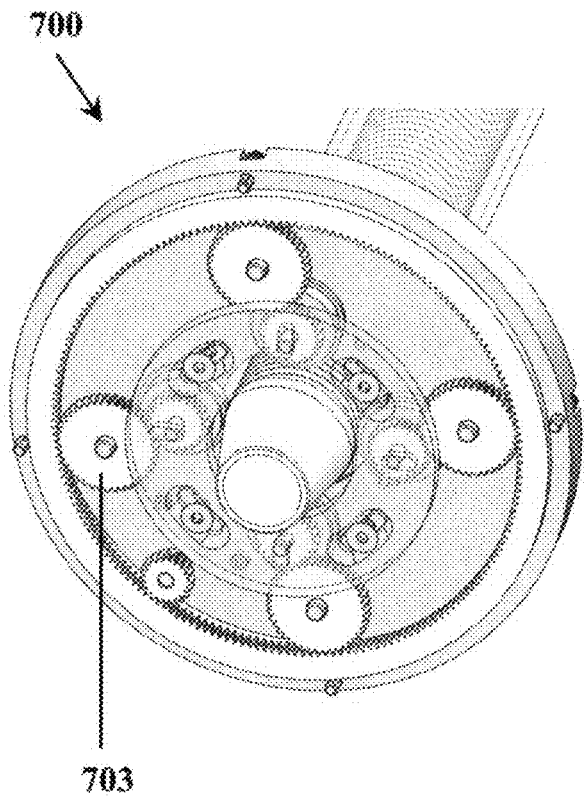
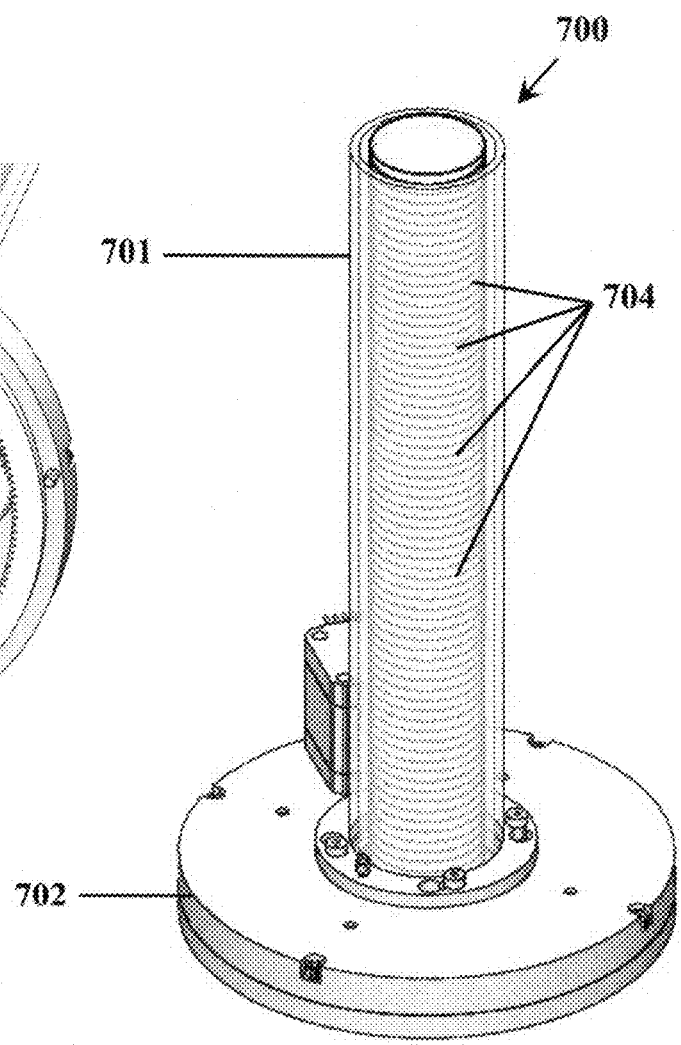
FIG. 7a
FIG. 7b

METHODS AND SYSTEMS FOR AUTOMATIC DISPENSING OF BEVERAGE

CROSS-REFERENCE TO RELATED PATENT DOCUMENTS

This patent application claims the benefit of priority of U.S. Provisional Application No. 63/227,367, entitled "METHODS AND SYSTEMS FOR AUTOMATIC DISPENSING OF BEVERAGE," filed Jul. 30, 2021, which is hereby incorporated herein by reference in its entirety.

TECHNICAL FIELD

The present disclosure relates to automatic dispensing of beverages, and more particularly to dispensing liquid shots and pre-filled liquid beverages based on user requirements.

BACKGROUND

In general, a liquid/liquor dispenser is configured with pre-filled liquids, are electrically powered, and can perform multiple operations Manual dispensers can be operated by selecting a required beverage through control elements equipped with a timer. The control elements and the timer allow a user to select various operations by manually placing liquid shot glasses. The manual dispenser can cause discrepancies in dispensing or mixing complex beverages which can result in wastage of the beverages. Also, with the manual dispenser, it may be tedious to perform the proper mixing of the beverages, which results in poor quality of the resultant beverage. The manual dispenser may consume time and be inconsistent as the performance of the manual dispenser may vary between individuals depending upon the skill levels of the individuals.

The conventional liquid dispensing machine may consume time to fill various complex beverages ordered by the users. If a user decides to reject an order by removing the liquid shot glass, it may result in the wastage of the beverages. Therefore, the user neglecting the order may tend to waste the beverage.

Existing liquid/liquor dispensers may have an interface to control the dispensing of liquid-filled cans and liquid-filled shots. The user on providing the user requirements may receive the liquid-filled can that may be dropped from the dispensing machine. The user on receiving the can may experience spillage of the liquid and the dropped can accumulate dust or debris making the users uneasy and uncomfortable while using the can.

FIGS. 3a and 3b illustrate a conventional method for the automatic dispensing of beverage, according to embodiments as disclosed herein. As illustrated in FIGS. 3a and 3b, in the conventional methods, the dispensing of liquid is performed by dispensing the pre-filled beverages in the refrigerated compartment through the spirals to drop the product. As illustrated in FIGS. 3a and 3b, in the vending machines the spiral rotates and dispenses the product. The machine contains columns that slide out of the refrigerated compartment for restocking. Therefore, the conventional vending machines utilize spirals for dropping products of various sizes. Thus, the products are dropped down the chute into a drop box, which makes it difficult to retain the pre-filled liquid beverages in a glass container due to sloshing of the liquid in the glass container.

SUMMARY

The principal object of the embodiments herein is to disclose methods and systems for the automatic dispensing of beverage, and more particularly to dispensing liquid shots and prefilled liquid beverages based on user requirements.

Another object of the embodiment herein is to disclose methods and systems for the automatic dispensing of liquid shots of pre-defined cup size.

Another object of the embodiments herein is to disclose methods and systems for avoiding the wastage of beverages based on user requirements.

BRIEF DESCRIPTION OF FIGURES

Embodiments herein are illustrated in the accompanying drawings, throughout which like reference letters indicate corresponding parts in the various figures. The embodiments herein will be better understood from the following description with reference to the drawings, in which:

FIGS. 3a and 3b illustrate a conventional dispensing system for the automatic dispensing of beverage, according to the prior art;

FIGS. 7a and 7b illustrate example diagrams of a cup dropper assembly for the dispensing system for the automatic dispensing of beverage, according to embodiments as disclosed herein;

DETAILED DESCRIPTION OF THE EMBODIMENTS

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

The embodiments herein disclose methods and systems for the automatic dispensing of beverage, and more particularly dispensing liquid shots and pre-filled liquid beverages based on user requirements. The claimed invention deals with customer customer-operated vending machines to dispense liquid beverages by dispensing a pre-filled liquid or a sealed can with filled liquid.

Figure 1:
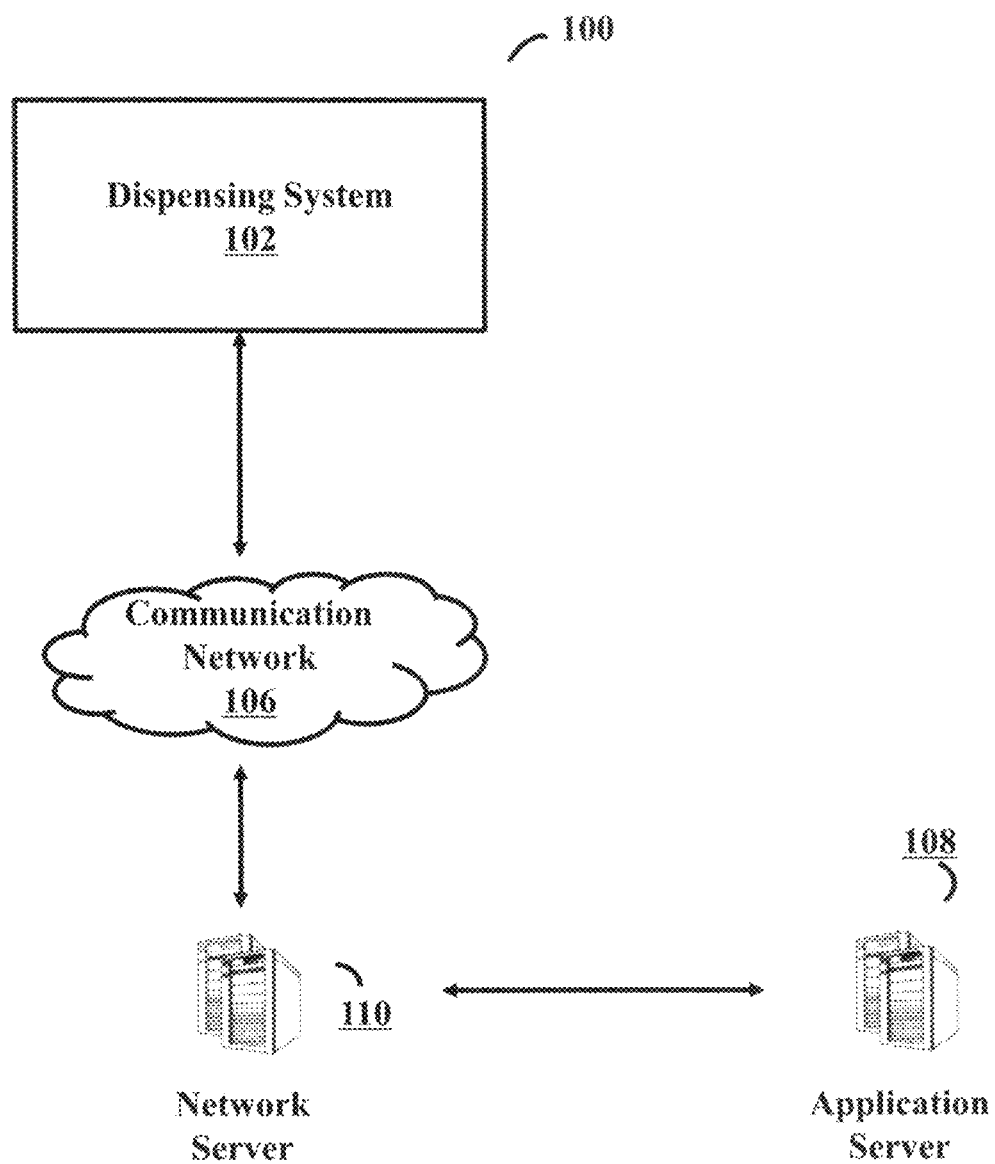
FIG. 1 illustrates an environment diagram for the automatic dispensing of beverage, according to embodiments as disclosed herein.

FIG. 1 illustrates an environment diagram for the automatic dispensing of beverage based on user requirements using a dispensing system 102, according to embodiments as disclosed herein. As illustrated in FIG. 1, the environment 100 includes the dispensing system 102. The dispensing system 102 may be connected to a communication network 106 through which the devices may be in turn connected to a network server 110. The dispensing system 102 may be connected to an application server 108 through the communication network 106 and/or the network server 110 or a different communication network (not shown).

The dispensing system 102 can be a system that enables user(s) to interact and provide liquid shots or pre-filled liquid beverages based on user requirements. In an embodiment herein, the dispensing system 102 can be a stand-alone device, a kiosk, a refreshment stall, a vending machine, an automated machine, a coin-operated machine, or a displaying device to dispense liquid shots. In an embodiment herein, the dispensing system 102 can be provided with provisions to integrate therewithin another device such as, but not limited to, a mobile phone, a smartphone, a tablet, a phablet, a personal digital assistant (PDA), a computer, a laptop, a phone, an IoT device, a wearable device, a vehicle infotainment system, a Television (TV), a camera and so on.

The pre-defined liquid beverages referred to herein may include alcoholic beverages such as, but not limited to, beer, wine, distilled spirits such as brandy, whisky, rum, gin, cognac, vodka, tequila, pisco, China distilled spirit, and the like.

The dispensing system 102 may also have access to databases (not shown) for fetching information for queries received from the user. In addition, the dispensing system 102 may further connect to at least one of a cloud, a dedicated user interaction device cloud, a server, and so on, using at least one communication network for accessing information for the queries received from the user. Examples of the communication network can be, but not limited to, the internet, a wired network (a Local Area Network (LAN), Ethernet, and so on), a wireless network (a Wi-Fi network, a cellular network, a Wi-Fi Hotspot, Bluetooth, Zigbee and so on) and so on.

In an embodiment, the environment 100 may include several dispensing systems 102, and the communication network 106 as illustrated in FIG. 1. Examples of the dispensing systems 102 can be, but are not limited to, a kiosk, a refreshment stall, a vending machine, an automated machine, coin-operated machine, displaying device and the like which are placed at different locations (a bar, a restaurant, an amusement parks or festivals, outdoor shopping malls, hotels, lodging areas, snack or break areas, and so on).

The dispensing system 102 can enable the user to interact using a user interface which is used to receive requests from the user such as the required number of liquid shots, pre-filled liquid beverages, liquid-filled cans, pouches, and the like. The user interface of the dispensing system 102 is provided with screens to perform payment, to accept user details to check the age of the user, accept the Universal Serial Bus (USB) power ports, and the like. The dispensing system 102 can be connected to other electronic devices through various rapid charging ports such as USB ports, wireless-charging ports, detachable charging ports, and the like. The dispensing system 102 can provide a rapid charging means for electronic devices such as, but not limited to, a mobile phone, a smartphone, a tablet, a phablet, a personal digital assistant (PDA), a computer, a laptop, a phone, an IoT device, a wearable device, a vehicle infotainment system, a Television (TV), a camera and so on. The dispensing system 102 with the rapid charging ports can be used to transfer data from the dispensing system 102 and to perform other transactions. The dispensing system 102 can be provided with audio units such as speakers, transmitters, receivers, and the like. The dispensing system 102 can be provided with video units such as image capturing units such as cameras, videotapes, Liquid Crystal Display (LCD), Light Emitting Diode (LED) touch screens to perform user interaction, and the like.

Figure 2:
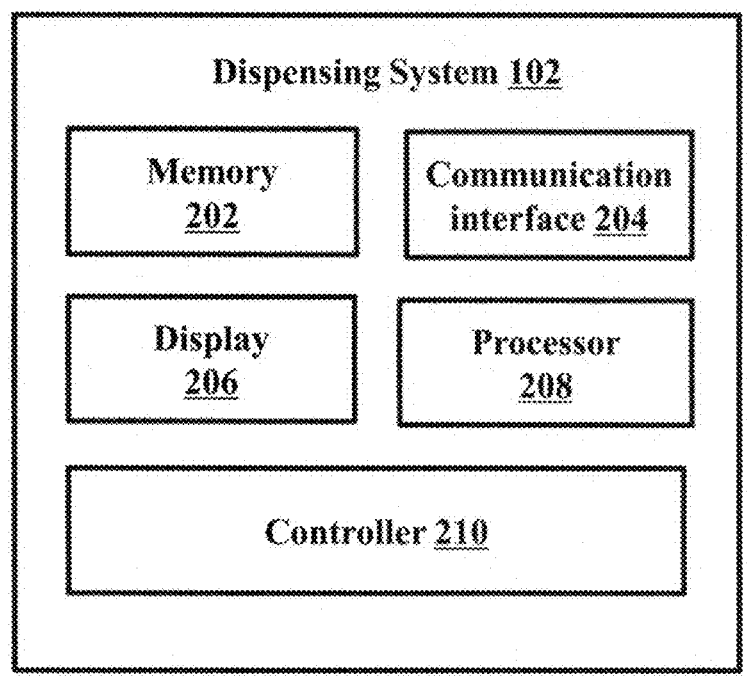
FIG. 2 depicts a block diagram illustrating various units of a dispensing system that is used for the automatic dispensing of beverage, according to embodiments as disclosed herein.

FIG. 2 depicts a block diagram illustrating various units of a dispensing system 102 which is used for the automatic dispensing of beverage, according to embodiments as disclosed herein. The dispensing system 102 may include suitable hardware and software to directly communicate with the users through the communication network.

The dispensing system 102 may include a memory 202, a communication interface 204, a display, a processor 208, a controller 210, and the like. The communication interface 204 can establish communication between the dispensing system 102 and at least one external entity, such as, but not limited to, at least one of the pluralities of electronic devices such as mobile phone, a smartphone, a tablet, a phablet, a personal digital assistant (PDA), a computer, a laptop, a phone, an IoT device, a wearable device, a vehicle infotainment system, a Television (TV), a camera and so on through the communication network. The communication network 106 can be, but is not limited to, the internet, a wired network (a Local Area Network (LAN), Ethernet, and so on), a wireless network (a Wi-Fi network, a cellular network, a Wi-Fi Hotspot, Bluetooth, Zigbee and so on) and so on.

The memory 202 of the dispensing system 102 can be configured to store the user details, available beverages, quantity of the beverages, number of empty glasses, temperature of the beverages, user transaction, and the like. The memory 202 can be configured to store user details, user-related information, and so on.

The memory 202 may include one or more computer-readable storage media. The memory 202 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 202 may, in some examples, be considered as a non-transitory storage medium. The term "non-transitory" may indicate that the storage medium is not embodied in a carrier wave or a propagated signal. However, the term "non-transitory" should not be interpreted to mean that the memory 202 is non-movable. In some examples, the memory 202 can be configured to store larger amounts of information than the memory. In certain examples, a non-transitory storage medium may store data that can, over time, change (e.g., in Random Access Memory (RAM) or cache).

The display 206 of the dispensing system 102 can be configured to interact with the user through the user interface to receive requests from the user. The display 206 of the device can be configured to initiate user transactions by verifying the age of the user to ensure eligibility of the user for consumption of alcoholic beverages. The display 206, on verifying the age allows the users to select the beverage from the list of menus displayed on the display screen.

The user can select from a range of products including, but not limited to, pre-filled beverages, liquid-filled shot glasses, multiple products (multiple beverages), customized beverages (mixing of various beverages), and the like. The pre-filled beverages or liquid-filled shots can be in packed cans, pouches, filled in a shot glass, and the like.

The user on selecting the beverages, can pay for the number of ordered beverages through the payment terminal of the display 206 on the dispensing system 102. The payment terminal can accept the cashless or cash method as the payment method. After the completion of the payment, the dispensing system 102 can dispense the pre-filled beverages, liquid filled in shots glass, multiple beverages can be dispensed sequentially.

When a user selects a liquid to be filled in a shot glass, the dispensing system 102 can provide the required amount of the ordered or the selected liquid in the empty shot glass. The dispensing system 102 can sequentially dispense multiple beverages ordered in a single transaction ordered by the user. The dispensing system 102 can perform the mixing of the beverages requested by the user to provide a customized beverage to the user. The user on failing to remove the beverage from the device, is notified with the message to remove the ordered beverage from the dispensing system 102 before performing another transaction. The dispensing system 102 can automatically dispose of the neglected product by rejecting the neglected product into the waste receptacle of the dispensing system 102.

The processor 208 can be at least one of a single processor, a plurality of processors, multiple homogeneous or heterogeneous cores, multiple CPUs of different kinds, special media, and other accelerators. Further, several processing units 208 may be located on a single chip or over multiple chips. The memory 202 can include a program code/program instruction that can be executed on the processor 208 to execute one or more steps for dispensing the beverages to the user.

The processor 208 can be configured to enable the dispensing system 102 to communicate with other electronic devices. The dispensing system 102 can be connected to other electronic devices through various rapid charging ports such as USB ports, wireless-charging ports, detachable charging ports, and the like. The dispensing system 102 can provide a rapid charging feature for various other electronic devices such as, but not limited to, a mobile phone, a smartphone, a tablet, a phablet, a personal digital assistant (PDA), a computer, a laptop, a phone, an IoT device, a wearable device, a vehicle infotainment system, a Television (TV), a camera and so on. The dispensing system 102 can be provided with video units such as image capturing units such as cameras, videotapes, Liquid Crystal Display (LCD), Light Emitting Diode (LED) touch screens to perform user interaction, and the like.

The controller 210 can be a hardware or software component that manages or directs the flow of data between any two entities. For example, the controller 210 can be but is not limited to, cards, microchips, or separate hardware devices for controlling the peripheral devices. The controller 310 can be any unit that interfaces between two systems and manages communication between them.

Figure 3:
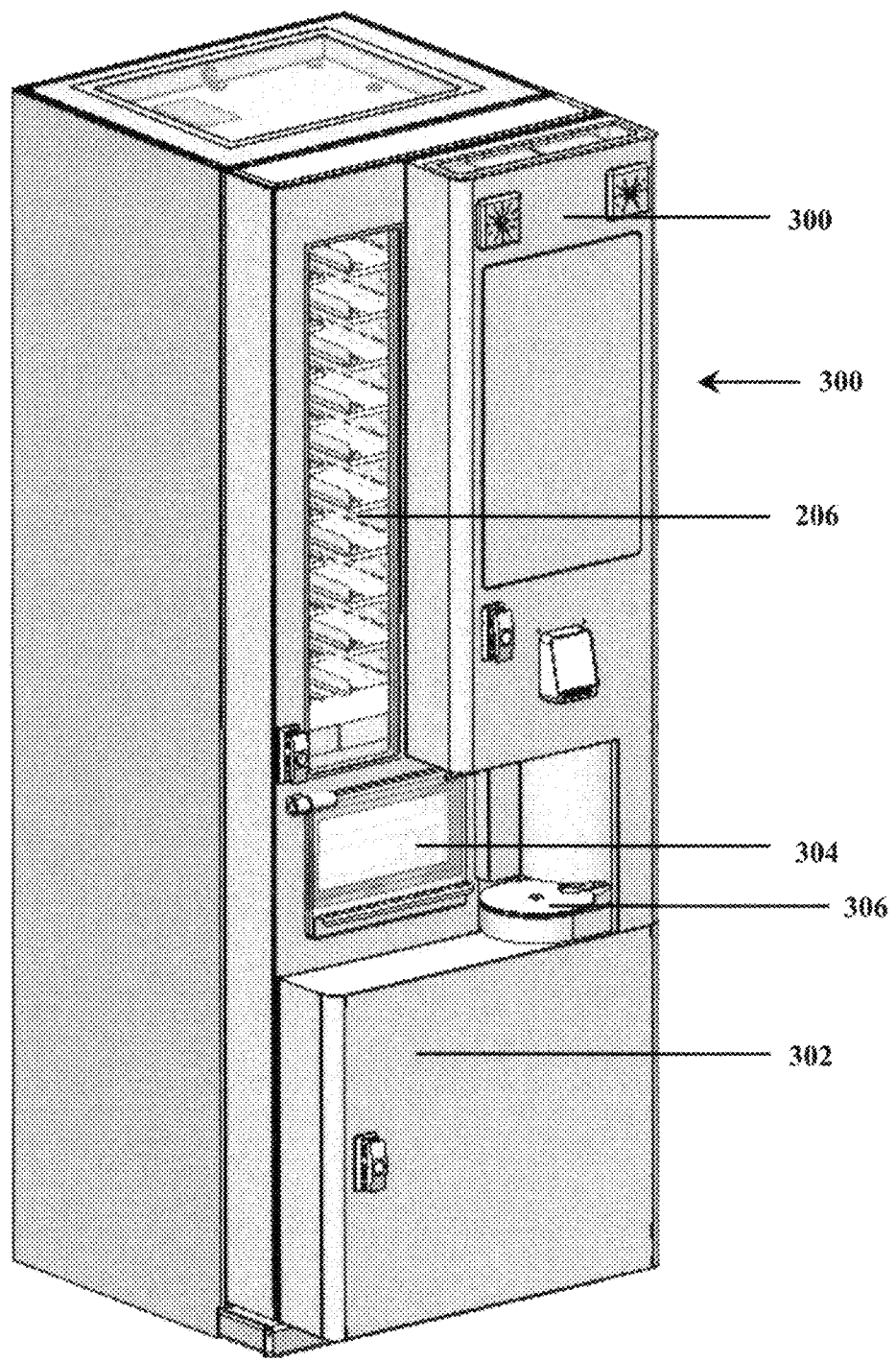
FIG. 3 illustrates an example diagram of the front view of a dispensing system for the automatic dispensing of beverage, according to embodiments as disclosed herein.

FIG. 3 illustrates an example diagram of the front view of the dispensing system 102 for the automatic dispensing of beverage, according to embodiments as disclosed herein. As illustrated in FIG. 3, the dispensing system 102 for dispensing liquid beverages is configured to be in the form of a cabinet with a front door assembly 301 comprising a display 206 with the touch screen interface and a payment terminal for the user to interact. Pre-filled beverages with the containers are dispensed in the front dispensing area 304 and the liquid filled into shot glass is dispensed to the nearby dispensing area 306.

As illustrated in FIG. 3, the front door assembly 301 includes an upper door assembly 300 and a lower door assembly 302. The upper door assembly 300 of the dispensing system 102 includes the display 206, payment terminal, speakers, USB power ports, a cup dropper, and other items. The lower door assembly 302 includes a warm liquid/liquor storage compartment 504 (See FIG. 5a), a turret, a waste chute, and a waste receptacle. The warm liquid/liquor storage is for the liquid that should be stored at room temperature and only for the liquor dispensed into shot glasses. The front door assembly 301 is thermally insulated with interior panels that are thermally isolated from the outside environment. The front door assembly 301 is configured to provide electrical and fluid connections routed through the front door assembly 301 and mechanism integrated within it.

As illustrated in FIG. 3, the upper door assembly 300 of the dispensing system 102 can be connected to other electronic devices through various rapid charging ports such as USB ports, wireless-charging ports, detachable charging ports, and the like. The dispensing system 102 can provide a rapid charging feature for various other electronic devices. The dispensing system 102 can be provided with video units such as image capturing units such as cameras, videotapes, Liquid Crystal Display (LCD), Light Emitting Diode (LED) touch screens to perform user interaction, and the like.

As illustrated in FIG. 3, inside the dispensing system 102 is a refrigerated compartment 303 for storing the liquids to be kept at the cool temperature, either pre-filled or bulk storage of liquid. The cabinet portion of the dispensing system 102 comprises an inner and outer shell with thermal insulation kept in between the shells. A thermal break is used to isolate the inner and outer shells which are connected. Also, a cooling unit is supplied by the refrigeration unit that slides into the base of the cabinet.

Figure 4A:
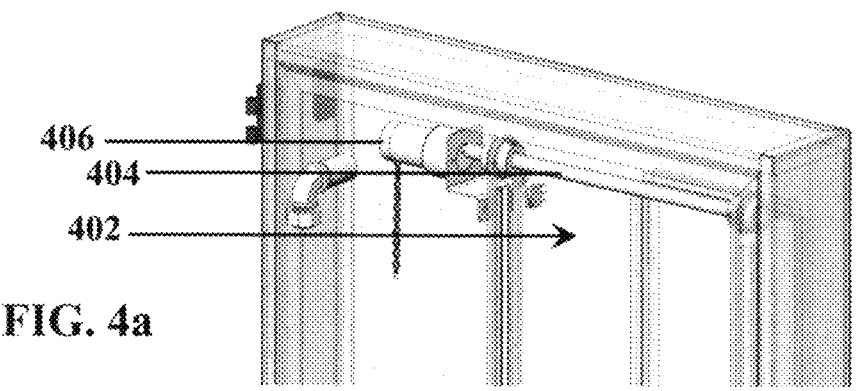
FIGS. 4a, 4b, and 4c illustrate example diagrams of an elevation of the dispensing system for the automatic dispensing of beverage, according to embodiments as disclosed herein.
Figure 4B:
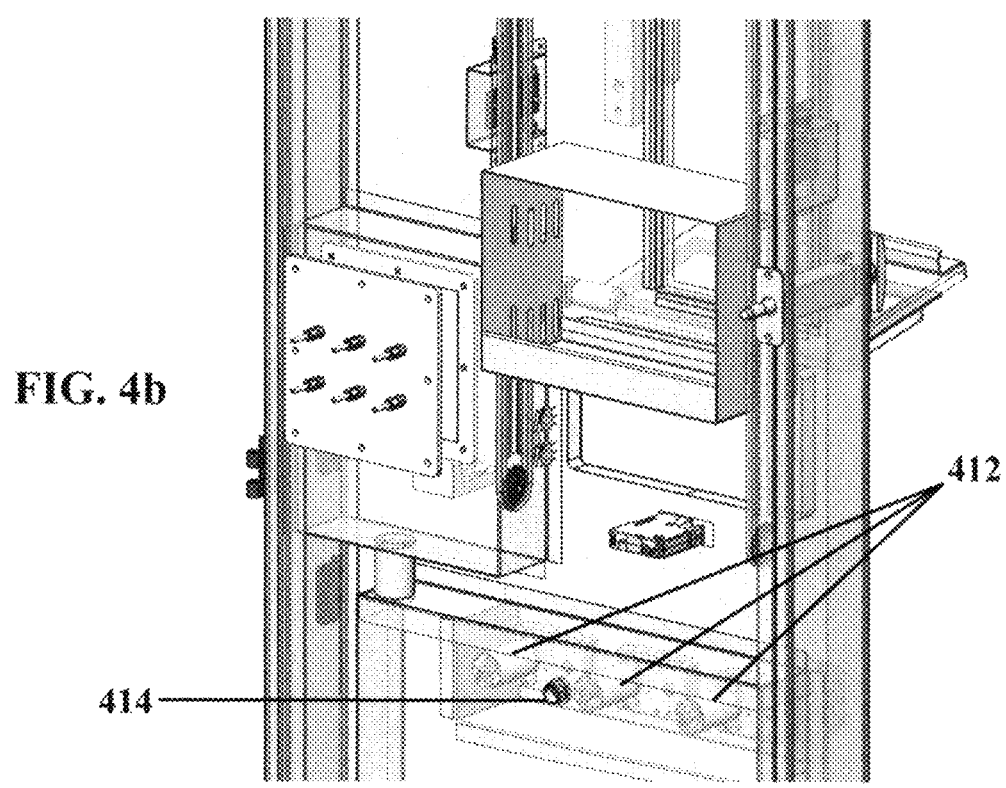
Figure 4C:
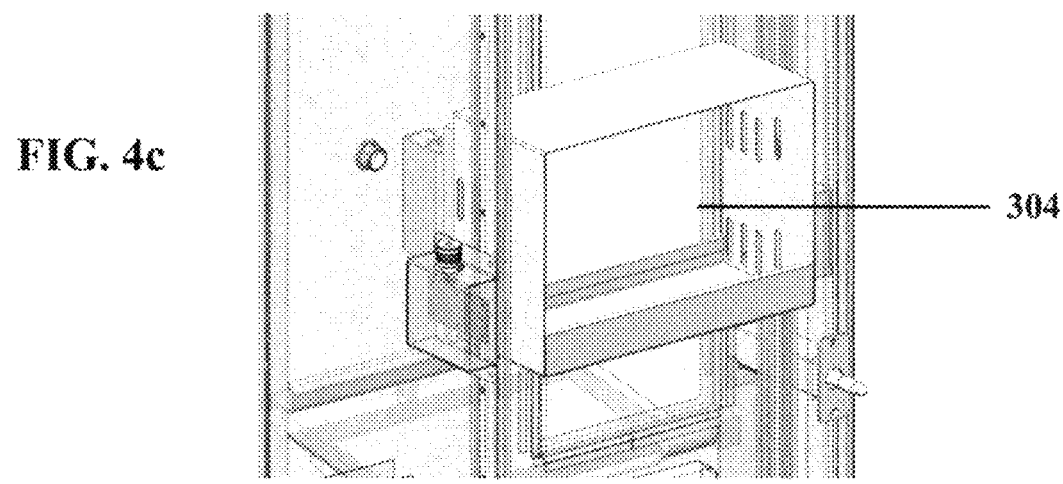

FIGS. 4a, 4b, and 4c illustrate example diagrams of an elevation of the dispensing system 102 for the automatic dispensing of beverage, according to embodiments as disclosed herein. As illustrated in FIG. 4a the device comprises an elevator 402 to gently transfer the product down to the dispensing area 304. The dispensing is performed by a pair of linear slides enabling the elevator platform to move vertically through a pair of roller chain loops. Further, the roller chain loops are configured with sprockets on top and bottom on either side of the elevator platform to provide vertical motion, wherein both chain loops are driven by a common shaft 404 connected to a motor 406.

As illustrated in FIG. 4b, the sensor feedback for a home position, a top, and a bottom position of the dispensing product is tracked using the travel time. Further, in FIG. 4b, motors 412 are used for sufficient reduction to prevent back driving of the dispensing product is performed by the motor (DC motor). Therefore, DC motors 412 will require a low-resolution encoder 414 to position the platform at the various positions required. Also, a light curtain is included to check whether the elevator platform contains the product. The elevator platform is checked by the light curtain at a convenient location along its travel.

As illustrated in FIG. 4c, the dispensing area 304 comprises a door 502 (See FIG. 5a) which can be unlocked only when the elevator platform is at the bottom of travel. So, the user can manually open the door by lifting it upward to retrieve the product. Also, a gas spring can close the door ensuring that the doors are locked with the corresponding latches. Therefore, on completion of the transaction, the elevator platform is scanned through the light curtain to check whether the elevator is empty.

Figure 5A:
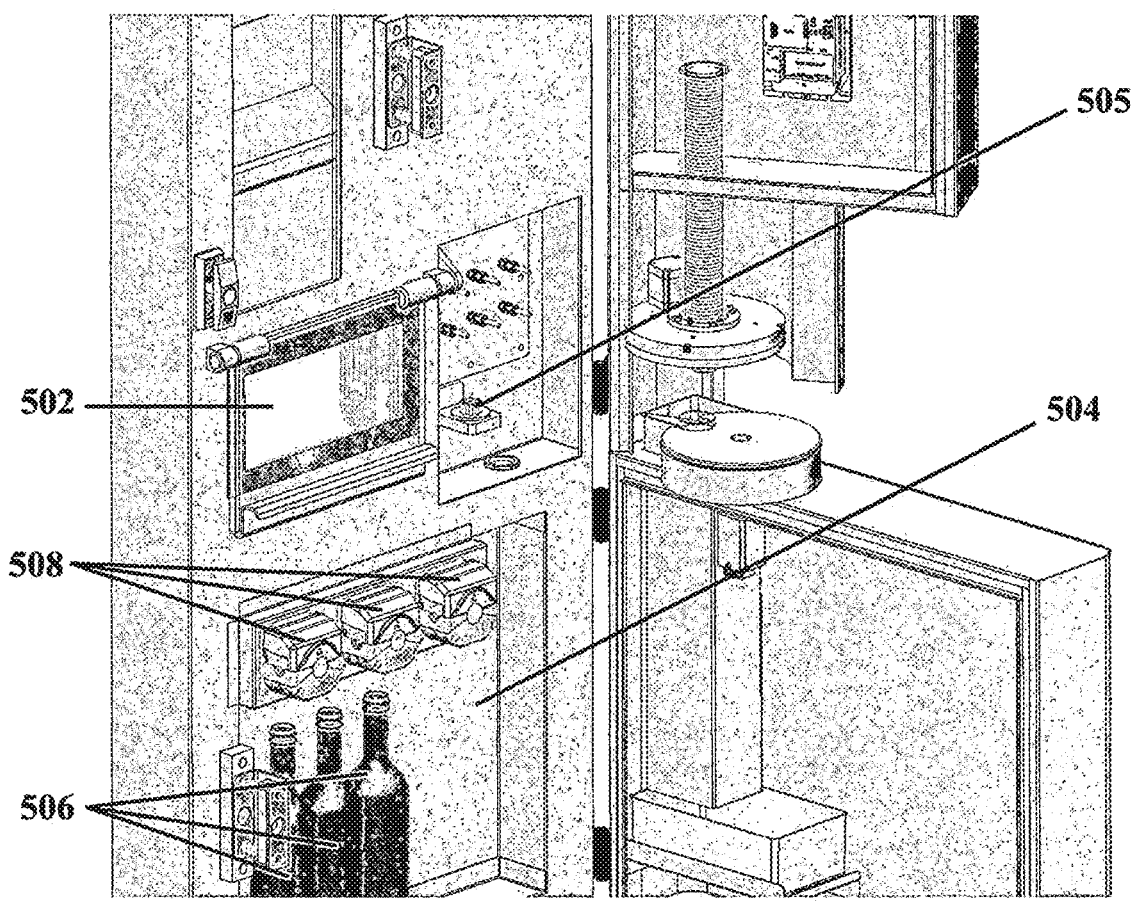
FIGS. 5a and 5b illustrate example diagrams of a door assembly inside the dispensing system for the automatic dispensing of beverage, according to embodiments as disclosed herein.
Figure 5B:
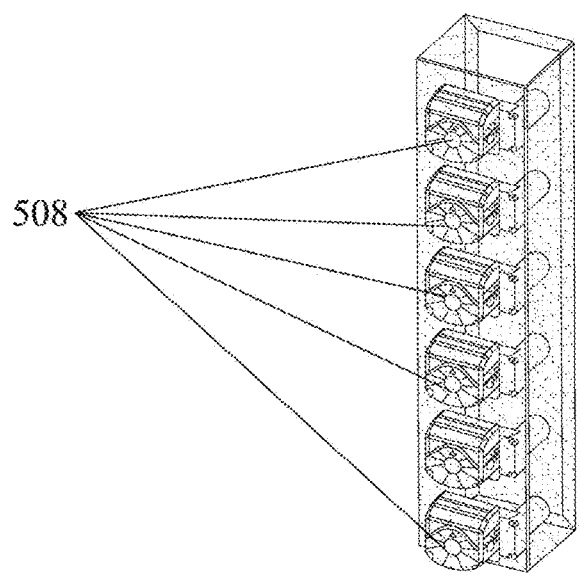

FIGS. 5a and 5b illustrate example diagrams of the door assembly 301 inside the dispensing system 102 for the automatic dispensing of beverage, according to embodiments as disclosed herein. As illustrated in FIG. 5a, the door assembly 301 inside the dispensing system 102 is shown. The bulk liquid/liquor is stored in bottles, wherein the liquor is supplied, within the refrigerated compartment 303 or the warm storage compartment 504, based on the type of liquid. Each bottle is configured to have a plastic tube inserted into it to siphon liquor out of the bottle.

As illustrated in FIG. 5b, the tubes are connected to a peristaltic pump 508, which is used to measure the volume of liquid. The tube employs the peristaltic pump's mechanism, wherein the liquid never contacts any part of the peristaltic pump 508. The peristaltic pumps 508 used for chilled liquid/liquor are located inside the refrigerated compartment 303 and the backs of the peristaltic pumps 508 are mounted in a sealed enclosure. The bulkhead fittings are used to transfer the liquid from the inside of the refrigerated compartment 303 to the outside. The short straight pieces of stainless-steel tubing wherein the plastic tubes are connected (elevator mechanism).

As illustrated in FIG. 5a, the door assembly 301 is opened inside the automatic dispensing system 102 device. The warm storage compartment 504 is present, except the bottles 506 and peristaltic pumps 508 are at room temperature. A bulkhead is not required, therefore a continuous tube from a bottle 506, to pump 508, to a nozzle 505 is used. In an embodiment there are six cold liquor/liquid circuits and three warm liquid/liquor circuits, totaling nine pumps 508 and nozzles 505 are present. Therefore, each liquor/liquid has its own nozzle 505 located in a cluster above the shot glass, which is being filled.

Figure 6:
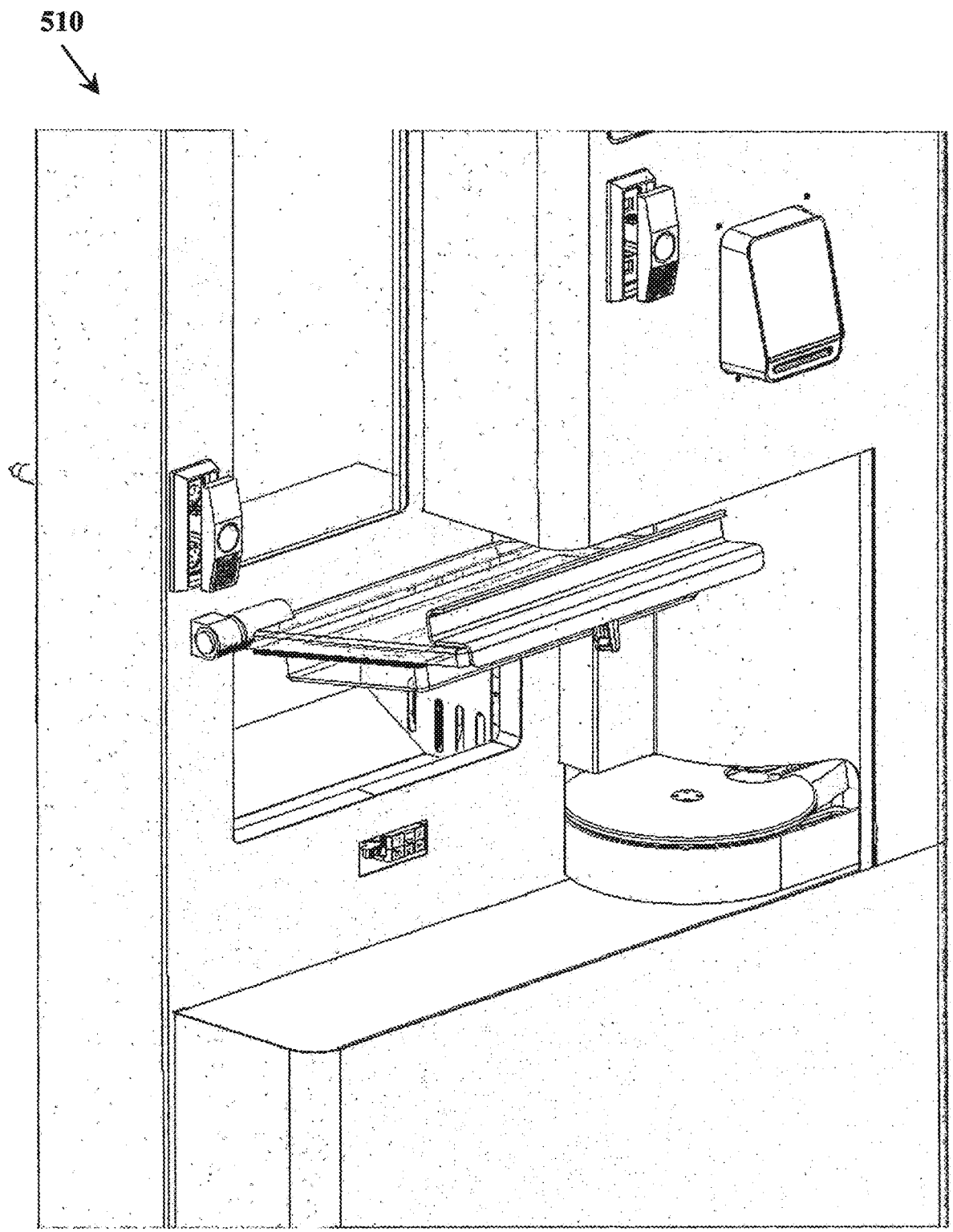
FIG. 6 illustrates an example diagram of an open-door assembly for the dispensing system for the automatic dispensing of beverage, according to embodiments as disclosed herein.

FIG. 6 illustrates an example diagram of an open-door assembly 510 for the dispensing system 102 for the automatic dispensing of beverage, according to embodiments as disclosed herein. As illustrated in FIG. 6, the open-door assembly 510 of the dispensing system 102 is used to dispense the pre-filled liquid/liquor in the shot glass. The dispensing system 102 can be provided with a rapid charging facility for the electronic device.

The dispensing system 102 can be provided with the image capturing unit can be, but not limited to, a digital camera, media capturing device, web camera, single-lens reflex (SLR), Digital SLR (DSLR), mirrorless camera, compact camera, video recorders, digital video recorders, Closed Circuit Television (CCTV), and the like. Therefore, the users need not pay the photographer fee. The dispensing system 102 can be connected to the communication network which can be, but is not limited to, the internet, a wired network (a Local Area Network (LAN), Ethernet, and so on), a wireless network (a Wi-Fi network, a cellular network, a Wi-Fi Hotspot, Bluetooth, Zigbee and so on) and so on.

The dispensing system 102, therefore, reduces the wait time of the user thereby making the self-service faster and easier. Also, creates a way for bars, bartenders, and mixologists to generate revenue with automation. The users need not pay professional photographers for photos and may lessen human interaction with self-service and thereby reduce the human error. The dispensing system 102 eliminates the over-pouring and theft of beverages in the current location. The dispensing system 102 frees up the staff time for higher value service and can rapidly charge the user's electronic device for free. The business owners of the dispensing machine can save more money on labor.

FIGS. 7a and 7b illustrate example diagrams of an assembly 700 of a cup dropper assembly 701 for the automatic dispensing of liquid, according to embodiments as disclosed herein. As illustrated in FIG. 7a, the cup dropper 701 is used to drop a plastic shot glass from a magazine onto a turret 702. The turret 702 serves as a rotating holder for the cup dropper 701, wherein the dispensing cups are dropped into a onto the turret 702. Further, the turret 702 is used to transfer the cups to several stations.

Firstly, in the cup dropper stations, the fresh shot glasses are dropped into the dispensing system 102. Secondly, the turret 702 rotates the shot glass under the nozzles 505 wherein the liquid/liquor is filled. The next station is the dispensing area 306, which is used to dispense the liquid/liquor filled glass shots that are delivered to the requested users. Finally, the turret 702 completes a rotation back to the cup dropper station, and the turret 702 travels over the disposal station. Thus, to prevent the shot glass either filled or empty from making its way back to the cup dropper station. Therefore, on detecting the shot glass, which will be ejected into a waste receptacle.

As illustrated in FIG. 7b, the cup dropper 701 has been designed for dispensing shot glass-sized cups for filling the liquid/liquor. The cup dropper 701, contains a series of peripheral protrusions 704 that rotate to separate the cups on the bottom of the stack. The cup dropper 701 has been configured to have four peripheral protrusions 704 that wedge in between the rims of the cups which are nested together in a stack. Thus, the peripheral protrusions 704 change in pitch as they rotate, causing the bottom cups to separate and drop. Therefore, during each revolution of the peripheral protrusions 704 is the one-cup drop cycle. Also, the position of the four peripheral protrusions 704 is adjusted to accommodate a range of cups, they swivel in eccentrically to achieve adjustments. The peripheral protrusions 704 are geared together through ring and planet gears 703, thereby a stepper motor is used to cycle the mechanism.

Figure 8A:
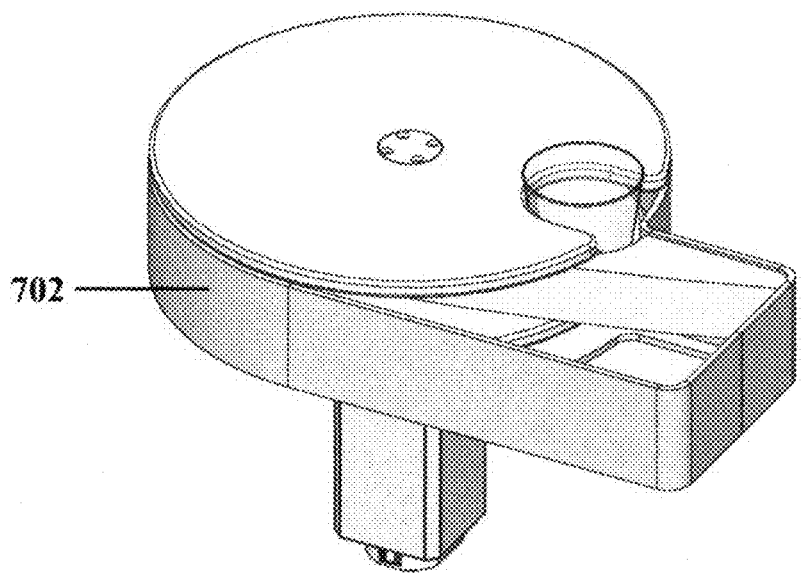
FIGS. 8a, 8b, and 8c illustrate example diagrams of a turret assembly for the dispensing system for the automatic dispensing of beverage, according to embodiments as disclosed herein.
Figure 8B:
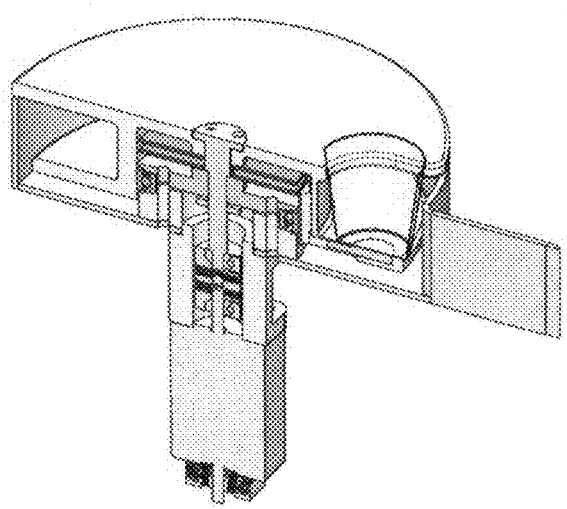
Figure 8C:
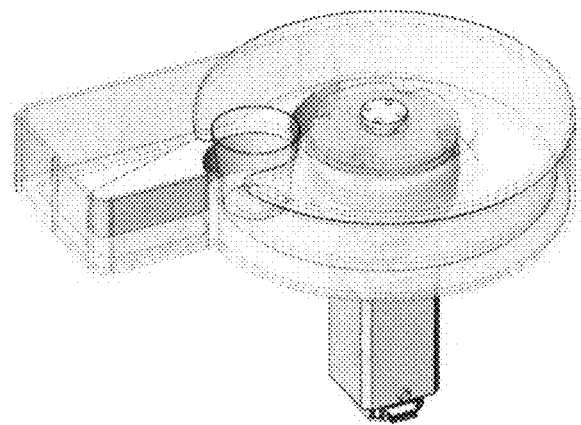

FIGS. 8a, 8b, and 8c illustrate example diagrams of a turret assembly 702 for the dispensing system 102 for the automatic dispensing of beverage, according to embodiments as disclosed herein. As illustrated in FIG. 8a, the turret 702 is the rotating element riding on bearings and powered by the stepper motor with a single pocket, wherein a plastic shot glass drops into. As illustrated in FIG. 8b, the bearing arrangement is a ball bearing used to support the radial loads at the bottom of the turret 702 and a journal bearing to support the radial and thrust loads at the top of the turret 702.

The bearing assembly is pre-loaded in the axial direction through a wave spring and the stack-up is held together by a snap ring. Therefore, the snap ring helps in easy assembly and disassembly of the bearing assembly. The snap ring can be removed and the turret 702 can be lifted upwards out of the turret frame. An O-ring is used to seal the bottom of the turret below the ball bearing, to prevent any liquid ingress into the turret mechanism.

In addition to the bearing arrangement, a slip ring is used for electrical connections to the turret-mounted sensor. In an embodiment, the arrangement employs two sensors in the turret 702, a home position sensor to mark the home position of the turret, and a sensor to detect the cup on the turret 702. The home position sensor can be an inductive proximity sensor positioned radially to sense a target on the turret 702. When the sensor detects the target, the home position of the cup is detected. The second sensor is a capacitive proximity type used for detecting non-metallic targets. The second sensor is mounted facing up in the pocket to sense the presence of shot glass or if the pocket is empty.

The turret rotation is achieved by the stepper motor, thereby eliminating the home position sensor if the reduction of gearing between the motor gear and the turret is not used. Therefore, an encoder with a reference pulse would provide the home position, thus both the home position methods are available. The motor shaft is directly coupled to the input shaft of the turret 702, the turret bearing and the drive stack-up are connected. The shot glass traveling in the pocket contacts a cam, in the exception so the user has not removed the shot glass. Therefore, the shot glass follows the surface of the cam and the exterior frame of the turret assembly until it is rejected from the turret and falls through the opening in the turret assembly, wherein it falls down the chute into a waste receptacle.

Figure 9:
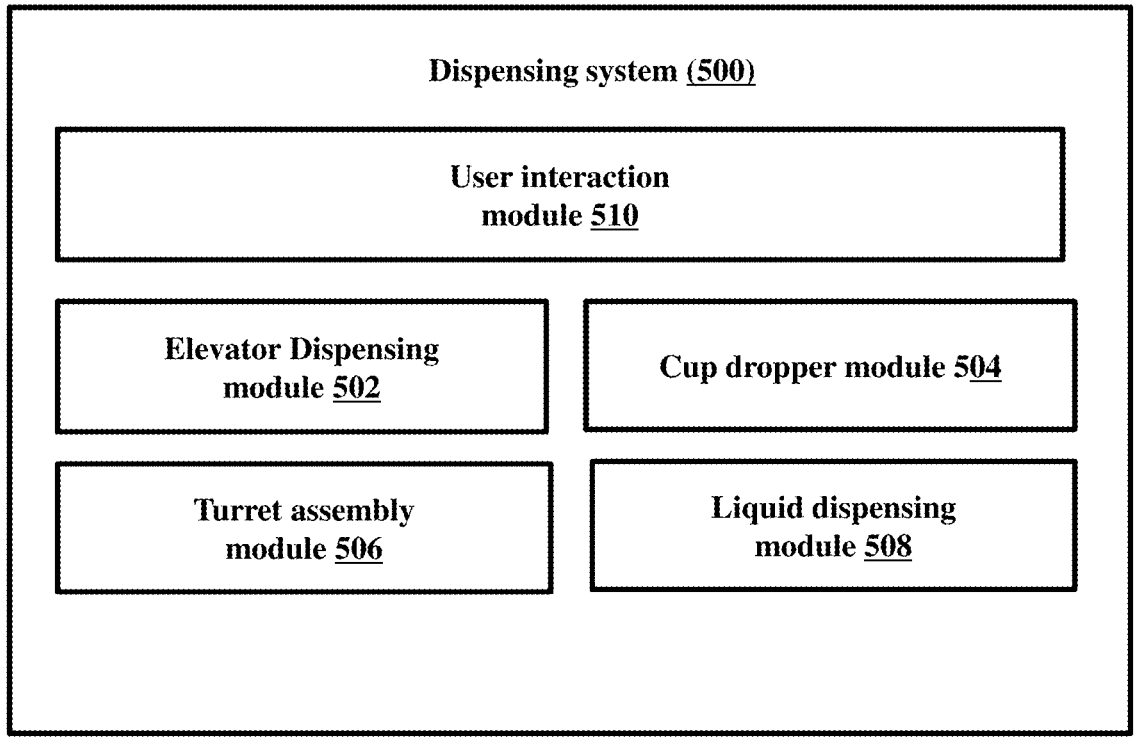
FIG. 9 depicts a block diagram illustrating various units of a dispensing system for the automatic dispensing of beverage, according to embodiments as disclosed herein.

FIG. 9 depicts a block diagram illustrating various units of a dispensing system 500 for the automatic dispensing of beverage, according to embodiments as disclosed herein. The dispensing system 500 may include a user interaction module 510, an elevator dispensing module 502, a turret assembly module 506, a cup dropper module 504, and a liquid dispensing module 508. The dispensing system 500 can be accessed by the user, through a communication network, any electronic device, and so on.

As disclosed in FIG. 9 the dispensing system 500 can be accessed with an electronic device such as, but not limited to a mobile phone, a smartphone, a tablet, a phablet, a personal digital assistant (PDA), a computer, a laptop, a phone, an IoT device, a wearable device, a vehicle infotainment system, a Television (TV), a camera, a IoT server, an internet server, a communication network and so on.

In an embodiment, the dispensing system 500 can be configured and includes the user interaction module 510, to enable the user to interact with the dispensing system 500. The dispensing system 500 can enable the user to interact using the user interface which is used to receive requests from the user such as the required number of liquid shots, pre-filled liquid beverages, liquid-filled cans, pouches, and the like. The user interface of the dispensing system 500 is provided with screens to perform payment, accept user details to check the age of the user, accept the Universal Serial Bus (USB) power ports, and the like.

In an embodiment, the dispensing system 500 can be configured with and includes the elevator dispensing module 502 to dispense the liquid-filled shot glasses using the elevator mechanism. As illustrated in FIG. 4a the elevator dispensing module 502 comprises an elevator 402 to gently transfer the liquid-filled shot glasses down to the dispensing area 306. The dispensing is performed by the elevator 402 a pair of linear slides enabling an elevator platform to move vertically through a pair of roller chain loops. Further, the roller chain loops are configured with sprockets on top and bottom on either side of the elevator platform to provide vertical motion to the elevator platform, wherein both chain loops are driven by a common shaft connected to a motor.

In an embodiment, the dispensing system 500 can be configured and includes cup dropper module 504 to drop the cups on the turret 702 to dispense the liquid. As illustrated in FIG. 7a, the cup dropper 701 is used to drop a plastic shot glass from a magazine into a turret 702. The turret 702 serves as a rotating holder for the cup dropper, wherein the dispensing cups are dropped into a turret 702. Further, the turret 702 is used to transfer the cups to several stations.

In an embodiment, the dispensing system 500 can be configured and includes turret assembly module 506 for the automatic dispensing of liquid. As illustrated in FIG. 8a, the turret 702 is the rotating element riding on bearings and powered by the stepper motor with a single pocket, wherein a plastic shot glass drops into. The bearing arrangement is a ball bearing used to support the radial loads at the bottom of the turret 702 and a journal bearing to support the radial and thrust loads at the top of the turret 702.

In an embodiment, the dispensing system 500 can be configured and includes liquid dispensing module 508 to dispense the liquid/liquor into the dispensing cups. The dispensing area 306 comprises a door that can be unlocked only when the elevator platform is at the bottom of travel. So, the user can manually open the door by lifting it upward to retrieve the product. Also, a gas spring can close the door ensuring that the doors are locked with the corresponding latches. Therefore, on completion of the transaction, the elevator platform is scanned through a light curtain.

Figure 10:
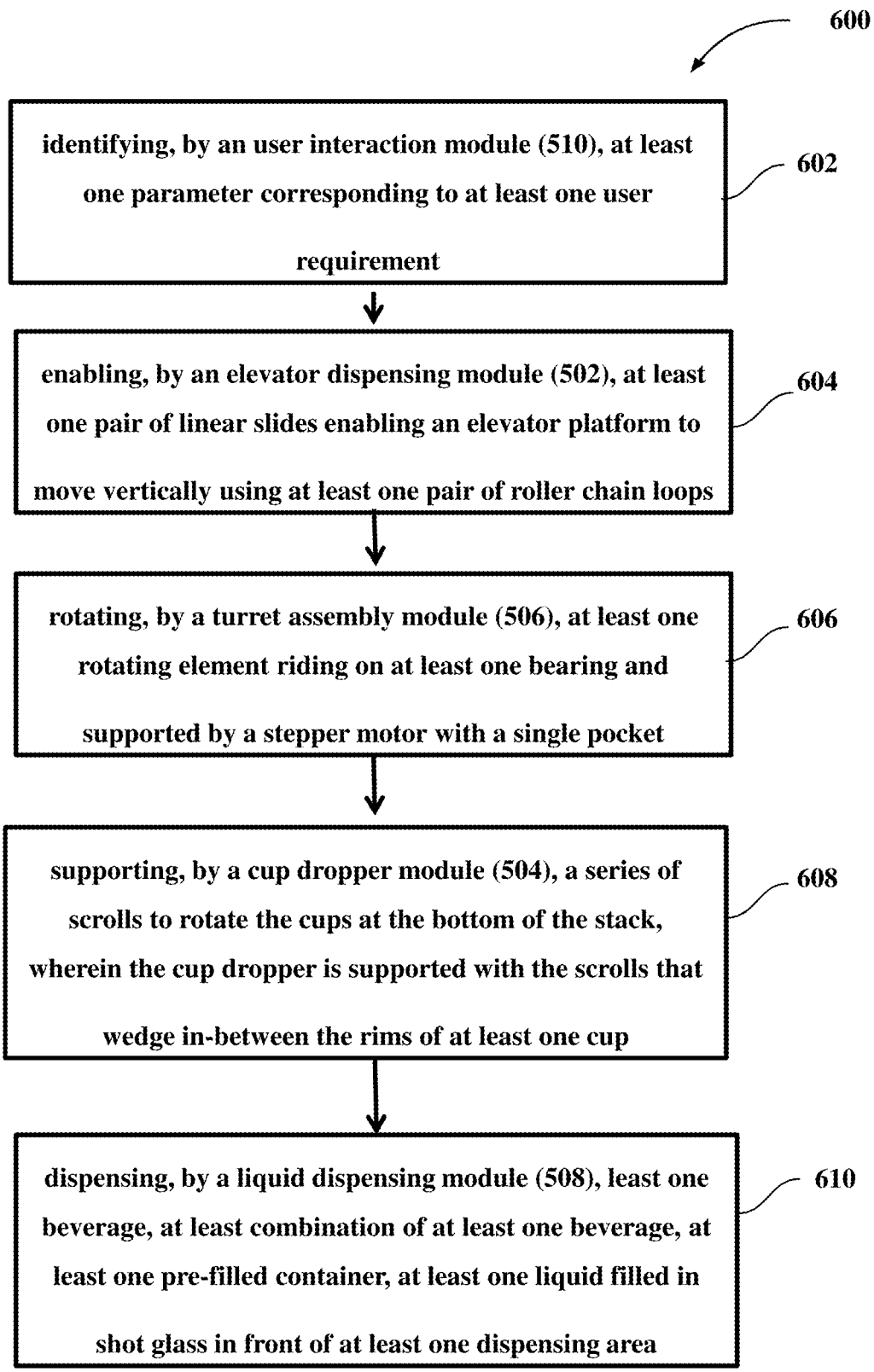
FIG. 10 discloses a flow diagram illustrating a method for the automatic dispensing of beverage to the user, according to embodiments as disclosed herein.

FIG. 10 discloses a flow diagram illustrating a method 600 for the automatic dispensing of liquid to the user, according to embodiments as disclosed herein.

At step 602, the method 600 includes, identifying, by the user interaction module (510), at least one parameter corresponding to at least one user requirement.

At step 604, the method 600 includes, enabling, by the elevator dispensing module (502), at least one pair of linear slides enabling an elevator platform to move vertically using at least one pair of roller chain loops.

At step 606, the method 600 includes, rotating, by a turret assembly module (506), at least one rotating element riding on at least one bearing and supported by a stepper motor with a single pocket.

At step 608, the method 600 includes, supporting, by a cup dropper module (504), a series of peripheral protrusions 704 to rotate the cups at the bottom of the stack, wherein the cup dropper is supported with the peripheral protrusions 704 that wedge in-between the rims of at least one cup.

At step 610, the method 600 includes, dispensing, by a liquid dispensing module (508), at least one beverage, at least a combination of at least one beverage, at least one pre-filled container, at least one liquid filled in a shot glass in front of at least one dispensing area.

The various actions, acts, blocks, steps, or the like in the method and the flow diagram 600 may be performed in the order presented, in a different order, or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

What is claimed is:

1. A dispensing system for automatic dispensing of beverages, comprising:
   a user interaction module;
   an elevator dispensing module;
   a turret assembly module;
   a cup dropper module; and
   a liquid dispensing module,
   wherein the user interaction module is in communication with a processor, wherein the user interaction module is configured to identify at least one parameter corresponding to at least one user requirement,
   wherein the elevator dispensing module is configured to dispense liquid-filled shot glasses through an elevator configured to transfer the liquid-filled shot glasses down to at least one dispensing area, the elevator comprising at least one pair of linear slides enabling an elevator platform to move vertically using at least one pair of roller chain loops,
   wherein the turret assembly module comprises a rotating holder for the cup dropper module, the turret assembly module configured with at least one rotating element riding on at least one bearing and supported by a stepper motor with a single pocket,
   wherein the cup dropper module is configured with a series of peripheral protrusions to rotate cups at a bottom of a stack, wherein a cup dropper is supported with peripheral protrusions that wedge in between rims of at least one cup; and
   wherein the liquid dispensing module is configured to dispense one or more of at least one beverage, a combination of beverages, at least one pre-filled container, and at least one liquid filled in a shot glass in front of the at least one dispensing area.

2. The dispensing system of claim 1, wherein the at least one parameter corresponding to the at least one user requirement comprises user age to access the dispensing system, and at least one beverage requested by the user.

3. The dispensing system of claim 1, wherein the at least one user requirement comprises dispensing one or more of the at least one beverage requested by the user, a combination of beverages, the at least one pre-filled container, and the at least one liquid filled in a shot glass.

4. The dispensing system of claim 1, wherein the at least one pair of roller chain loops is connected with sprockets on top and bottom on either side of the elevator platform to provide vertical motion.

5. The dispensing system of claim 1, wherein the at least one bearing is a ball bearing, and the turret assembly module is supported by a radial load at a bottom of a turret and at least one journal bearing to support radial and thrust loads to a top of the turret.

6. The dispensing system of claim 1, wherein the series of peripheral protrusions are configured to rotate and separate at least one cup.

7. A method for automatic dispensing of beverages, the method comprising:
   identifying, by a user interaction module, at least one parameter corresponding to at least one user requirement;
   enabling, by an elevator dispensing module, dispensing of liquid-filled shot glasses through an elevator to transfer the liquid-filled shot glasses down to at least one dispensing area, the elevator comprising at least one pair of linear slides enabling an elevator platform to move vertically using at least one pair of roller chain loops;
   rotating, by a turret assembly module, at least one rotating element riding on at least one bearing and supported by a stepper motor with a single pocket;
   supporting, by a cup dropper module, a series of peripheral protrusions to rotate the cups at a bottom of a stack, wherein a cup dropper is supported with peripheral protrusions that wedge in between rims of at least one cup; and
   dispensing, by a liquid dispensing module, one or more of at least one beverage, at least a combination of beverages, at least one pre-filled container, and at least one liquid filled in shot glass in front of the at least one dispensing area.

8. The method of claim 7, wherein the at least one parameter corresponding to the at least one user requirement comprises user age to access the dispensing system and at least one beverage requested by the user.

9. The method of claim 7, wherein the at least one user requirement comprises dispensing one or more of the at least one beverage requested by the user, a combination of beverages, the at least one pre-filled container, and the at least one liquid-filled in a shot glass.

10. The method of claim 7, wherein the at least one pair of roller chain loops is connected with sprockets on top and bottom on either side of the elevator platform to provide vertical motion.

11. The method of claim 7, wherein the at least one bearing is a ball bearing, and the turret assembly module is supported by a radial load at a bottom of a turret and at least one journal bearing to support radial and thrust loads to a top of the turret.

12. The method of claim 7, wherein the series of peripheral protrusions are configured to rotate and separate at least one cup.

\* \* \* \* \*